July 28, 1959 M. A. ALEXANDER ET AL 2,897,486

ANALOG-TO-DIGITAL CONVERSION SYSTEM

Filed Aug. 30, 1954 2 Sheets-Sheet 1

INVENTORS
MATTHEW ARNOLD ALEXANDER
RAYMOND STUART-WILLIAMS
BY Lyon & Lyon
ATTORNEYS INVENTORS
MATTHEW ARNOLD ALEXANDER
RAYMOND STUART-WILLIAMS
BY
Lyon & Lyon
ATTORNEYS United States Patent Office 2,897,486

Patented July 28, 1959

2,897,486

ANALOG-TO-DIGITAL CONVERSION SYSTEM

Matthew Arnold Alexander and Raymond Stuart-Williams, Pacific Palisades, Calif., assignors, by mesne assignments, to Telemeter Magnetics, Inc., a corporation of California

Application August 30, 1954, Serial No. 452,805

9 Claims. (Cl. 340—347)

This invention relates to devices for converting instantaneous values of a variable from analog-to-digital form and, more particularly, to an improvement in analog-to-digital conversion apparatus.

Analog-to-digital conversion apparatus is well known in which a voltage whose amplitude is the analog of a quantity is converted to digital form which is very easily stored, handled for computation, or used otherwise. One favored method for performing such conversion is to use a binary counter to count pulses for the length of time it takes for the ramp voltage generated by an integrator to equal the amplitude of the voltage being converted. The count in the binary counter is the digital representation of the amplitude of the voltage being converted. One such system is described in the Convention Record of the Institute of Radio Engineers, 1953 National Convention, Part 7, Electronic Computers, in an article by MacNight and Adamson entitled Multichannel Analog Input-Output Conversion System For Digital Computer.

In the analog-to-digital conversion, accuracy is a prime requirement. Factors which affect such accuracy must be corrected wherever possible. One of the causes of such inaccuracy is a variation in the slope of the ramp voltage which can result in an erroneous digital count. One method of correcting such an inaccuracy is described in the article noted above. The complete rundown time of the ramp is measured against a timing pulse. Too fast or too slow a rundown time results in a correction to the ramp generator slope control voltage.

A ramp may be nonlinear along its length yet still have a total rundown time which is proper. Therefore, errors may still occur for analog-to-digital conversions during some portion of the ramp which are undetected by timing the total rundown time.

An object of the present invention is to enable calibration of analog-to-digital conversion apparatus at any desired portion of the ramp rundown time.

Another object of the present invention is to provide a more accurate calibration system for analog-to-digital conversion apparatus.

Still another object of the present invention is to provide a simple and reliable calibration system for analog-to-digital conversion apparatus.

There are occasions in test equipment where an analog-to-digital conversion is used wherein the source of production of voltage to be converted may be one of the factors which varies due to variation in the environment of such source. In such a case, it can be desirable to vary the scale factor of the analog-to-digital conversion in accordance therewith, to avoid what might otherwise result in an erroneous rejection, so that the end result reflects the true test value of the voltage source although the voltage may actually be different than it was because of factors which have caused such change. Thus, where magnetic material is being tested, a standard magnetic material placed in the same environment may be employed to control the scale factor of the analog-to-digital conversion in accordance with the circumstances which operate to alter simultaneously the magnetic material under test, as well as the calibrating or standard magnetic material.

It is still a further object of this invention to present apparatus capable of controlling the scale factor of analog-to-digital converter apparatus in accordance with a standard.

Still a further object of the present invention is the provision of novel and unique calibrating apparatus for an analog-to-digital conversion system.

These and other objects of the invention are achieved in an analog-to-digital conversion system wherein the application of a voltage to be converted results in the provision of pulses, the number of which represents the amplitude of the voltage. A calibration interval is provided wherein a calibrating voltage is applied to the apparatus. The number of pulses is counted, and, if it exceeds a predetermined count which has been established in the calibrating apparatus, means are provided for increasing or decreasing the number of pulses to compensate for the difference. These means then control the apparatus until the next calibrating interval.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figures 1, 2, 4:
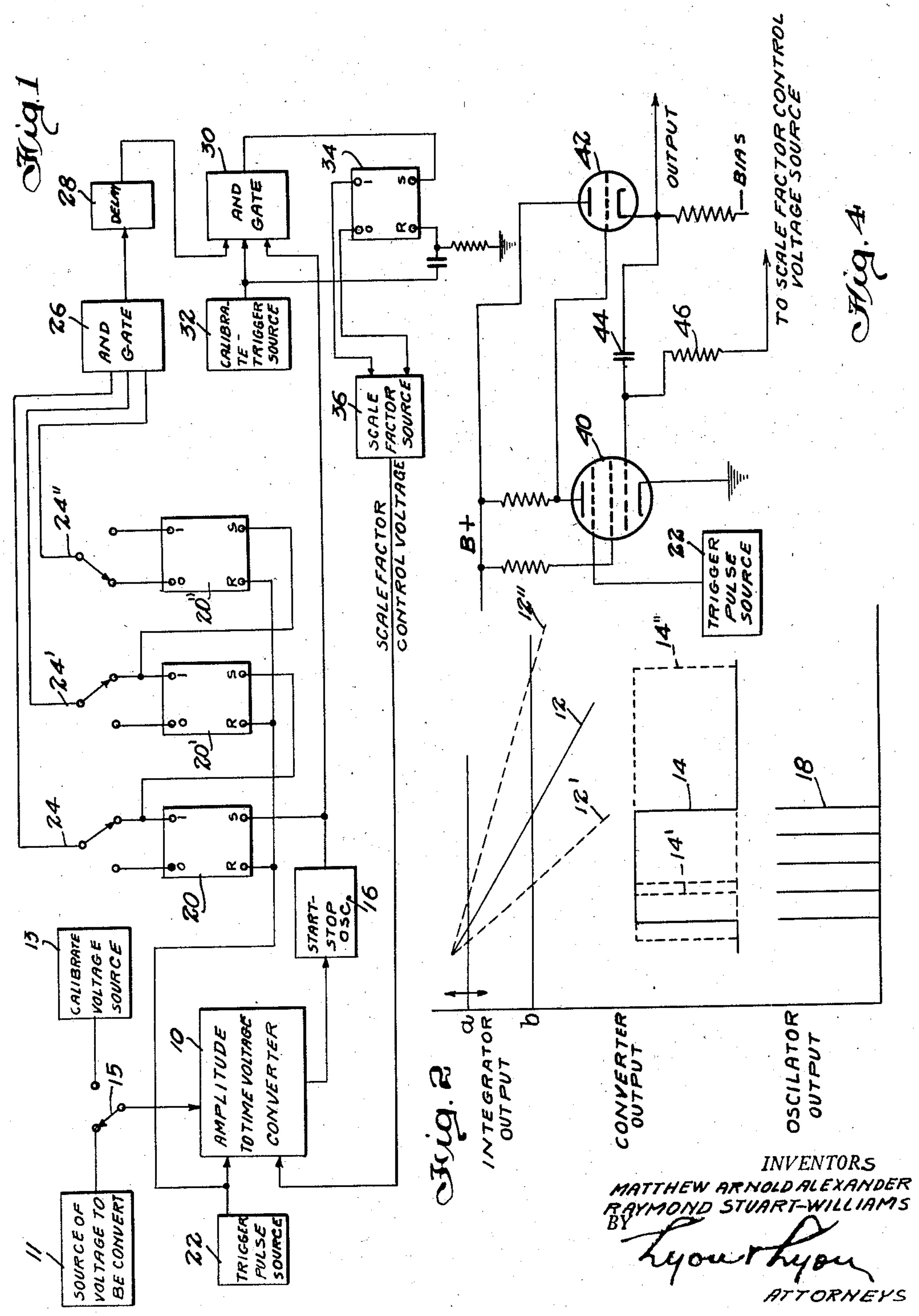
Figure 1 is a schematic diagram of an embodiment of the invention.
Figure 2 shows wave shapes to assist in an explanation of the invention.
Figure 4 is a circuit diagram of an integrating network used in the analog-to-digital converter.

Referring now to the schematic diagram of the embodiment of the invention shown in Figure 1, it comprises an amplitude to time voltage converter 10, to which is alternately applied a voltage to be converted from a source 11 of such voltages and a calibrate voltage from a source 13. The switch 15, which is shown to provide the alternate voltage applications, may be either a relay or electronic switch, as desired. The converter 10 may include an integrating network (shown in Figure 4) of the well-known Miller integrating type. This circuit operates to integrate the input voltage. This provides a sawtooth voltage in response to the input voltage in which the slope of the saw or rate of integration is determined by the voltage applied to the grid of the integrator tube.

The amplitude-to-time converter also includes voltage comparator circuits which may be of the well-known multiar types or other types shown and described in Waveforms by Chance et al., pages 335 et seq. and published by the McGraw-Hill Book Company. The output of the comparator is used to provide a voltage pulse whose width is determined by the length of time required for the integrator output to pass between two voltage values. This may be seen in Figure 2, wherein the diagram shows the saw portion 12 of a typical integrator output wave shape. If a voltage 14 is generated only when the output voltage (which decreases from a predetermined maximum) passes between the limits designated as *a* and *b* in Figure 2, it can be seen how the width of the voltage pulse 14 may vary if voltage *a* for example is closer to or further from *b*. The some effect may be achieved by varying the slope of the sawtooth. This may be seen from the other wave shapes 12', 12'', representing the output obtained as a result of applying voltages to the integrator respectively having higher and lower amplitudes. These can provide pulses 14', 14'' having larger and smaller durations than pulse 14. The gating techniques for obtaining a pulse whose width varies as the slope of an integrator output between two limits is well known in the radar and computer arts. These may be accomplished in one manner, for example, by using two comparator circuits, to one of which is applied the integrator output and the voltage to be converted and to the other of which is applied the integrator output and a fixed bias, for example, at level *b* in Figure 2. The two comparator outputs may then drive a flip-flop from one to the other condition of stability, thus providing the desired variable width pulse. This variable width pulse is applied to a start-stop oscillator 16. Pulses are obtained from the output of the start-stop oscillator 16 for as long as the variable width pulse lasts. As shown in Figure 2, for the duration of pulse 14, five output pulses 18 are derived from the oscillator. Accordingly, the greater the duration of the variable-width pule, the more oscillator output pulses are obtained, and vice versa. Thus, if the slope of the saw or the rate of integration is always maintained constant and if one of the voltages, say *a*, is varied up or down in accordance with a voltage desired to be converted and the voltage *b* is maintained constant, then the resulting pulse width 14 represents the voltage desired to be converted. The number of pulses derived from the start-stop oscillator is an indication of this voltage in digital form.

The scale factor of the digital representation of the unknown voltage is a function of the integrating rate. It can thus be seen how, by controlling the integrating rate of the integrating network, the scale factor of the representation of digital pulses for a given input voltage is controlled. The start-stop oscillator output, consisting of a series of pulses, is thus a digital manifestation of the amplitude of the input voltage. It may be used in that form or it may be applied to a binary counter 20 consisting of three flip-flop stages, as shown in Figure 1, to be counted and thus be converted to a pattern of coexisting voltages representative of the amplitude of the applied voltage. The system thus far described is known in the computer art.

It will be appreciated that factors which vary the characteristics of tubes or the other elements employed in the circuits can also vary the digital representation obtained. In order to compensate for any of these types of variations, a calibration system is provided. In order to operate the analog-to-digital apparatus and to reset the integrator circuit and counter for each input voltage, a source of trigger pulses 22 is required. In order to calibrate the analog-to-digital apparatus in accordance with this invention, a calibrating interval is provided. During this calibrating interval, voltage from a calibrating voltage source is applied to the analog-to-digital converter. This operates, as previously described, to present a train of pulses to the counter wherein a pattern of voltages is established, also as previously described.

A plurality of selector switches 24 are connected to certain output terminals of the trigger circuit counter 20 so that And gate 26 will be opened only when a predetermined count, as manifested by the output voltage pattern, is established by the counter. This count, in accordance with the connections shown in Figure 1, is achieved when three pulses are applied to the counter input. The count of three is shown merely by way of example and not by way of limitation. It will be appreciated that any desired count may be selected by establishing the positions of the selector-switch contacts. By way of example also, a three-stage binary counter is shown. Other well-known counters may be used instead. When the counter has received a sufficient number of pulses to make all the counter output terminals to which the selector switches are connected high, And gate 26, a three-input And gate, to which the three of them are connected passes a pulse. The And gate is of the type that requires a coincidence of all its inputs to provide an output. The And gate and binary counter are described in the book High Speed Computing Devices by Engineering Research Associates, Inc., published by McGraw-Hill Book Company. The And gate output is applied to a delay network 28. The delay network also can be any of the well-known types such as are found described by Chance et al. in Waveforms, pages 238 through 253, published by McGraw-Hill Book Company. The delay network must delay the output pulse from the And gate for the interval between pulses from the blocking oscillator 16. The delay network output is applied to a following And gate 30, which also has, as its two other inputs, a pulse from a calibrate trigger source 32 and the output of the start-stop oscillator. When these three inputs are coexisting, then this And gate 30 will provide an output pulse. The calibrate trigger pulse is applied at the beginning of the calibrating interval and is maintained during its existence.

The only pulse from the start-stop oscillator that can assist in opening the And gate 30 is the one that comes after the three pulses. If the number which opens up the gates is designated as $C_n$, then this pulse can be designated as the $C_{n+1}$ pulse. Accordingly, this And gate opens only when a count of $C_n$ has been established in the counter and a $C_{n+1}$ pulse is applied to the And gate. In this instance, $C_{n+1}$ would be four. The And gate output then serves to set a flip-flop circuit 34 into one of its two conditions of stability. The flip-flop circuit is set into its other condition of stability at the beginning of a calibration interval by a differentiated pulse from the calibrate trigger source. If the And gate provides an output, then the flip-flop 34 is turned over despite the continued application of the calibrate trigger source pulse, since this source applies the trigger through a differentiating network.

Stated otherwise, the flip-flop 34 may be set to have either a first or second condition of stability respectively designated at its output as 0 and 1. It is established in its first condition of stability at the beginning of each calibrating interval. It will remain in such condition unless an output is provided by the And gate, whereupon it is turned over to its second condition of stability. Thus, if the number of pulses derived as a result of the application of a calibrating voltage is less than the predetermined count established by the connection of the three gates, the flip-flop remains in its first condition of stability. If the number of pulses obtained in response to the application of the calibrating voltage exceeds the predetermined count, then the flip-flop is established in its second condition of stability.

Whichever condition the flip-flop has is sensed by a scale factor servo 36 which provides as output a scale factor control voltage. This is a voltage which serves to control the rate of integration and thereby the number of pulses obtained in response to the application of a voltage. When the calibrating voltage provides more than $C_n$ voltage pulses, it is indicative of the fact that the integrating rate is too slow and the pulse width too large. The control voltage operates to accelerate the integrating rate. When the calibrating voltage produces $C_n$ pulses or less, the control voltage serves to reduce the integrating rate and thus increase the pulse width and the number of pulses obtained as a result. Thus, the calibration apparatus serves to vary the rate of integration to provide either $C_{n+1}$ or $C_n$ pulses in response to the application of the calibrating voltage.

Figure 3:
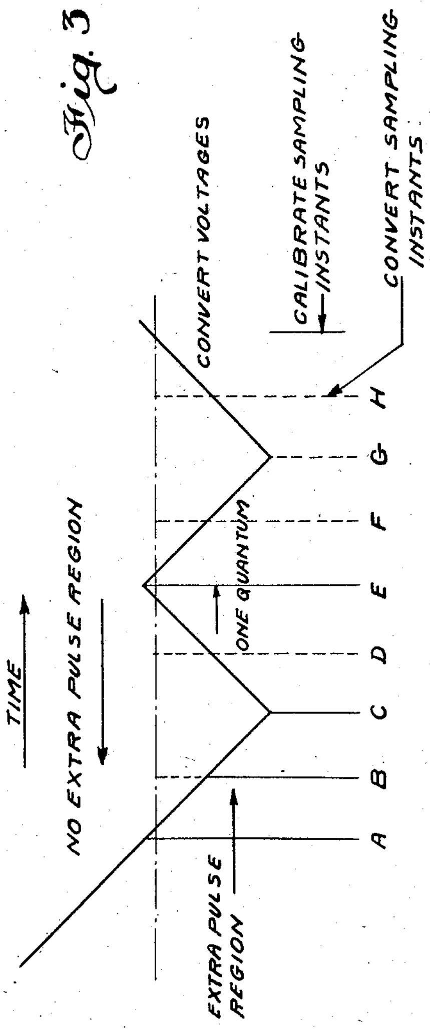
Figure 3 shows wave shapes representative of the variation in the conversion rate of the analog-to-digital conversion apparatus used by operation of the calibrating equipment.

Regarding Figure 3, a curve is shown representative of the rate of integration. Initially when first started it may be assumed that the integrating rate of the analog-to-digital converter was too large. The calibrating voltage produces $C_n$ or less pulses in this region. The scale factor control voltage serves to reduce the integrating rate continually. At point A, a calibrating interval occurs, and, since the number of pulses is still $C_n$ or better, the control voltage continues to reduce the rate of integration and, thereby, the scale factor. At point B on the curve, a voltage to be converted is applied to the analog-to-digital converter which is converted to digital form. At point C on the curve, another calibrating interval occurs, at which time it is found that the integrating rate is too fast and, accordingly, the control voltage operates to slow it up. At the interval designated by D, another conversion interval occurs. At interval E, another calibrating interval occurs in which it is found that the number of pulses produced is $C_{n+1}$ and the rate of integration is reversed again.

It will thus be appreciated that by means of the servo system shown in Figure 1 the rate of integration and, thus, the analog-to-digital conversion varies plus or minus one quantum of error with analog-to-digital conversion intervals for voltages occurring between the plus and minus one variations and thus when the converter functions most accurately. The interval between calibrations can determine the accuracy of the system.

Figure 4 shows the manner of application of the control voltage to the Miller integrator. The Miller integrator shown is of the type wherein feedback from plate to grid of the integrating tube 40 is made through a cathode follower 42, the feedback or integrating condenser 44 connecting the cathode of the cathode follower to the grid of the integrator tube. Output is obtained from the cathode-follower cathode. The triggering pulse, which enables conduction to occur in the integrating tube, is applied to the suppressor grid from the trigger pulse source 22. The control voltage from the scale factor source 36 is applied through a resistor 46 to the grid of the integrator tube 40. Thus, the rate of integration is controlled by the voltage from the scale factor source and, therefore, the scale factor of the digital representation is also controlled.

Figure 5:
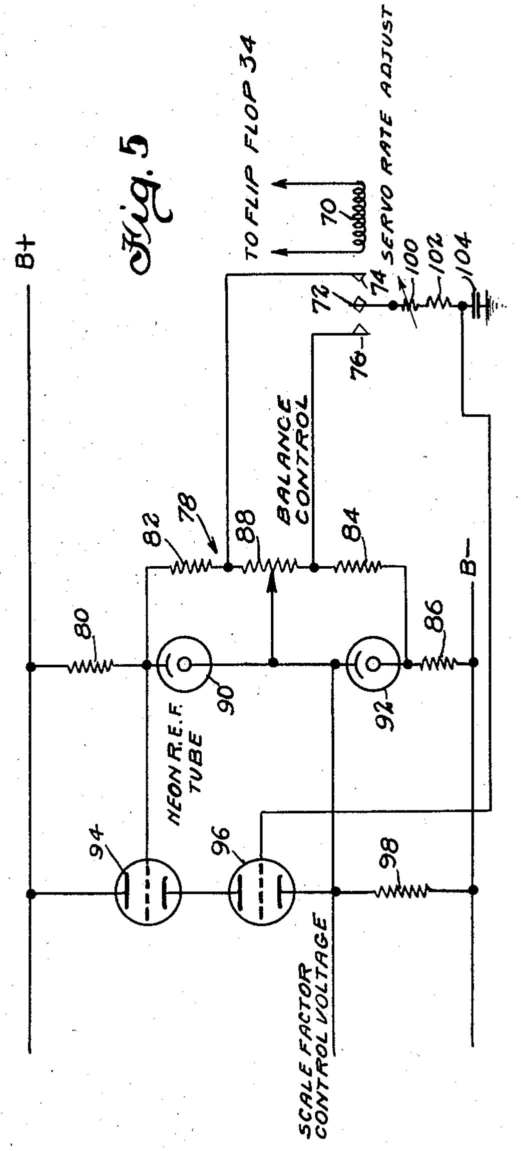
Figure 5 is a circuit diagram of the scale factor servo used in the embodiment of the invention.

Figure 5 is a circuit diagram of the scale factor voltage source 36. A relay has its coil 70 in series with the one side of the flip-flop 34, which is rendered conducting when an output pulse is derived from the second And gate 30. The servo control voltage has one of two values—either high or low, depending upon whether the movable contact 72 of the relay is being drawn against the stationary contact 74 connected to the higher voltage point of the voltage divider 78 or the movable contact when the relay is not operated is against the other stationary contact 76 connected to the lower potential point on the voltage divider 78.

The voltage divider 78 consists of four resistors 80, 82, 84, 86 in series with a potentiometer 88. There are two neon tubes 90, 92 which are connected in series between the lowest and highest 80, 86 of the four resistors. The neon tube junction point is connected to the movable arm of the potentiometer 88. The neon tubes are used for voltage regulation purposes to assist in maintaining the points across which the control voltage is derived as constant. Two tubes 94, 96 are connected in series across the source of operating potential. The grid of the upper tube 94 is connected to the anode of the upper neon tube 90. The cathode of the lower tube 96 is connected to the anode of the lower neon tube 92, and a load resistor 98 is in series with the cathode of this lower tube. The movable contact of the relay is connected in series with a variable resistor 100, a fixed resistor 102, and a condenser 104. The condenser 104 is also connected to the grid of the lower of the two tubes 98.

Thus, the control voltage is derived from the condenser. The rate of charge or discharge of the condenser determines the rate of control voltage change, and this can be adjusted suitably by adjusting the valve of the variable resistor 100. Dependent upon the condition of flip-flop 34, the relay connected therewith operates to vary the voltage across the condenser and, thereby, the voltage applied to control the rate of integration. The voltages may be made equal in both directions by adjustment of the balance potentiometer. The rate of the charging voltage on the condenser varies in accordance with $$\frac{-V_1}{R_1+R_2}$$

or $$\frac{+V_2}{R_1+R_2}$$

The values of $V_1$ and $V_2$ are standardized by the two neon tubes. The cathode-follower tube 96 is connected to the junction of the two neon tubes in order to insure a linear change of rate between the successive calibrating periods even if the required rate voltage approaches the value which causes $N_1$ or $N_2$ to extinguish. It will be seen that this particular arrangement has a very large dynamic range. The upper tube 94 is inserted to keep a constant plate potential applied to $V_2$. It can be seen further that the linearity and dynamic range of the servo control circuit is calculable and can be made to suit a particular application without affecting its method of operation.

The invention which has been described illustrates a system for continually measuring the scale factor of an analog-to-digital converter and, after comparing the measured scale factor with the demanded scale factor, such correction as is necessary is applied. Where the calibrating voltage and voltage to be converted are derived from objects which are subject to similar variation of humidity, temperature, and the like which affects their qualities and wherein, despite this, it is desired to pass the tested objects which under those circumstances measure up to the object used for the calibrating voltage, this invention provides the mechanism for controlling the analog-to-digital conversion so that this result can be achieved. It also operates to calibrate the apparatus itself where the conversion apparatus itself is the variable. This invention also permits a selection of the portion of the ramp voltage at which a calibration is to occur. Thus, if the general amplitude region of the voltages to be converted is known, the selector switches 24 can be set to provide calibration in this region and thus insure accuracy. Or, if the ramp voltage is known to have a region in which most errors occur, the switches can be set to provide calibration in this region. The system does not require any external complex tuning arrangements. It merely requires that the calibrating voltage source maintain the calibrating voltage amplitude substantially constant, a very simple thing to do.

Accordingly, there has been shown and described herein novel, useful, and improved system and apparatus for calibrating an analog-to-digital conversion system.

We claim:

1. In an analog-to-digital converter of the type wherein in response to the application of a voltage, a plurality of pulses are provided the number of said plurality being representative of the amplitude of said voltage, the improvement comprising means to apply a calibrating voltage to said converter, and means in response to the number of pulses produced as a result differing from a predetermined number to change the number of pulses produced to reduce said difference.

2. In an analog-to-digital converter of the type wherein in response to the application of a voltage a plurality of pulses are established, the number in said plurality being representative of the amplitude of said voltage, calibrating apparatus comprising means to apply a calibrating voltage to said converter, a counter connected to count the pulses produced in response to said calibrating voltage, means to derive an output signal from said counter when it attains a predetermined count condition, and means responsive to receiving said counter output signal to reduce the number of pulses produced representing said calibrating voltage and to not receiving said counter output signal to increase the number of pulses produced representing said calibrating voltage.

3. In an analog-to-digital converter of the type wherein in response to the application of a voltage an integrating network integrates said voltage, an oscillator in response to said integrator output over a predetermined range produces a plurality of pulses, the number in said plurality of pulses being representative of the amplitude of said voltage, and a counter counts said pulses to establish a voltage pattern representative of said count, calibrating apparatus for said converter comprising gate means coupled to said counter to provide an output pulse responsive to said counter attaining a predetermined count, means to delay the output of said gate means for the interval between pulses produced by said oscillator, a coincidence gate having one input connected to receive pulses from said oscillator and the second input connected to receive output from said means to delay, a flip-flop having a first and second condition of stability, means to apply a pulse to said flip-flop to establish it in a first condition of stability, means to apply an output from said coincidence gate to said flip-flop to establish it in a second condition of stability, and means responsive to the condition of said flip-flop to vary the rate of integration of said integrating network to compensate for any errors.

4. An analog-to-digital converter comprising terminals to which a first voltage to be converted to digital form is applied, means connected to said terminals to provide a second voltage responsive to said first voltage having a duration representative of the amplitude of said first voltage, means to which said second voltage is applied to provide a plurality of pulses the number of which is determined by the duration of said second voltage, counter means to establish a voltage pattern representative of the number of said pulses, a plurality of gates responsive to a predetermined voltage pattern of said counter means to provide an output pulse, and means responsive to the nonoccurrence of said output pulse to extend said second voltage duration and to the occurrence of said output pulse and the occurrence of an additional pulse in said plurality of pulses which establish said predetermined voltage pattern to reduce said second voltage duration.

5. An analog-to-digital converter as recited in claim 4 wherein said means responsive to the nonoccurrence and occurrence of said output pulse and the occurrence of an additional pulse includes an And gate responsive to the presence of both said pulses to provide a second output pulse, a flip-flop circuit having a first and second condition of stability, means to apply said second output pulse to establish said flip-flop circuit in said second condition of stability, and means responsive to said flip-flop circuit being in its first condition to extend said second voltage duration and being in its second condition to reduce said second voltage duration.

6. An analog-to-digital converter comprising an integrator, means responsive to said integrator output and to a first voltage to be converted to analog form to produce a second voltage having a duration representative of the amplitude of said first voltage, means to which said second voltage is applied to provide a plurality of pulses, the number of which is determined by the duration of said second voltage, means to count said pulses to establish a coexisting voltage pattern representative of the number of said pulses, and means responsive to whether or not a predetermined voltage pattern is attained by said means for count within a calibrating interval to change the rate of integration of said integrator to calibrate the scale factor of said second voltage duration to the amplitude of the first voltage responsive to which said second voltage is produced.

7. An analog-to-digital converter as recited in claim 6 wherein said means to count said pulses is a binary counter, and said means to change the rate of integration of said integrator includes means to apply a relatively higher or lower voltage to said integrator to change the rate of integration accordingly responsive to the output of said counter within said calibrating interval and to the number of pulses in said plurality of pulses.

8. A system for converting a voltage from analog to digital form comprising an integrating network, means to which said voltage is applied for a predetermined interval and to which said integrating network is coupled to provide an output pulse having a width determined by the rate of integration of said network means and the amplitude of said voltage, an oscillator responsive to the output from said means to provide a plurality of pulses, the number of said plurality being determined by the width of the output pulse, a counter to which said plurality of pulses are applied to establish a voltage pattern representative of the count of said pulses, a plurality of gates responsive to a predetermined voltage pattern provided by said counter to provide an output pulse, means to delay said pulse for an interval between pulses, an And gate, means to apply the output of said means to delay to said And gate, means to apply the output of said oscillator to said And gate, said And gate providing an output signal upon coincidence of the application of pulses to said And gate, a flip-flop having a first and a second condition of stability, means to apply said And gate output to said flip-flop to drive it to its second condition of stability, means responsive to said flip-flop being in its first condition to provide a first voltage and being in its second condition to provide a relatively lower second voltage, and means to apply said first or said second voltages to said integrating network to control its rate of integration.

9. A calibrated system as recited in claim 8 wherein said means responsive to said flip-flop includes a relay, a stable source of voltage including a voltage divider converted thereacross, said relay having one fixed contact connected to one potential point on said voltage divider and a second fixed contact connected to a second lower potential point on said voltage divider, a movable contact in contact with said one fixed contact when said relay is not operated and in contact with said second fixed contact when said relay is operated, means connecting said movable contact to said integrating network, and means connecting said relay to said flip-flop to be operated when said flip-flop is in its second condition of stability.

References Cited in the file of this patent

UNITED STATES PATENTS

| | | |
|---|---|---|
| 2,616,965 | Hoeppner | Nov. 4, 1952 |
| 2,660,618 | Aigrain | Nov. 24, 1953 |
| 2,700,501 | Wang | Jan. 25, 1955 |
| 2,715,678 | Barney | Aug. 16, 1955 |

OTHER REFERENCES

Part 7 of Convention Record, Mar. 23–26, 1953, IRE National Convention, copyright April 1953, "Multi Channel Analog Input-Output Conversion System for Digital Computer," by MacKnight et al.

Trans. IRE Professional Group on Instrumentation, June 1953, "The Sadic, A Precision Analog-Digital Converter," by Sink et al., pages 48 to 54.